(12) United States Patent
Smith (10) Patent No.: US 7,137,028 B2
(45) Date of Patent: *Nov. 14, 2006

(54) METHOD AND APPARATUS FOR IMPROVING RELIABILITY IN MICROPROCESSORS

(75) Inventor: Ronald O. Smith, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 140 days.

This patent is subject to a terminal disclaimer.

(21) Appl. No.: 10/787,232

(22) Filed: Feb. 27, 2004

(65) Prior Publication Data

US 2004/0205385 A1    Oct. 14, 2004

Related U.S. Application Data

(63) Continuation of application No. 09/820,703, filed on Mar. 30, 2001, now Pat. No. 6,708,284.

(51) Int. Cl.
*G06F 11/00* (2006.01)

(52) U.S. Cl. .......................... 714/10; 714/11; 714/12; 714/52; 714/800; 709/210

(58) Field of Classification Search ............ 714/10–12, 714/52, 800–819; 709/210, 400
See application file for complete search history.

(56) References Cited

U.S. PATENT DOCUMENTS

| | | | | | |
|---|---|---|---|---|---|
| 5,113,522 | A | * | 5/1992 | Dinwiddie et al. | 713/375 |
| 5,325,517 | A | * | 6/1994 | Baker et al. | 714/11 |
| 5,845,060 | A | * | 12/1998 | Vrba et al. | 714/12 |
| 6,549,028 | B1 | * | 4/2003 | Ohlhoff | 324/765 |
| 6,625,749 | B1 | * | 9/2003 | Quach | 714/10 |
| 6,625,756 | B1 | * | 9/2003 | Grochowski et al. | 714/17 |
| 6,658,621 | B1 | * | 12/2003 | Jamil et al. | 714/805 |
| 2001/0025338 | A1 | * | 9/2001 | Zumkehr et al. | 712/228 |

* cited by examiner

*Primary Examiner*—Scott Baderman
*Assistant Examiner*—Timothy M. Bonura
(74) *Attorney, Agent, or Firm*—Kenyon & Kenyon LLP (57) ABSTRACT

A method and system provides an increased robustness and protection against the occurrence of soft errors in parallel connect functional redundancy checking processors. This is achieved by predicting in advance the likely occurrence of a soft error and its impact on the resulting instruction flow and using already existing circuit implementations to hide the transient error.

15 Claims, 6 Drawing Sheets

METHOD AND APPARATUS FOR IMPROVING RELIABILITY IN MICROPROCESSORS

RELATED APPLICATIONS

This application is a Continuation of U.S. Ser. No. 09/820,703 filed on Mar. 30, 2001, now U.S. Pat. No. 6,708,284.

BACKGROUND OF THE INVENTION

1. Field of the Invention

The present invention relates generally to a processor system methodology. It particularly relates to a method and apparatus for providing an early indication of a processor soft error being propagated through a computing system.

2. Background

Modern semiconductor process technology is creating processors with smaller sizes to reduce hardware space and increase processor efficiency. However, the smaller sizes make the modern processor more susceptible to single event upsets that are transient errors (temporary or soft errors) caused by exposure to cosmic rays and/or alpha particles. Alpha particles, via atmospheric radiation or exposure to trace levels of radioactive materials in packaging, may permeate the computing processor and cause state devices (e.g., flip-flops) to make unplanned transitions from one state to another (e.g., bit value changes from 1 to 0). Also, for computing processors designed with domino logic (a type of circuit design of cascaded logic that are pre-biased), these transient errors may propagate throughout the entire system logic causing further instability and ultimately a hard failure (e.g., device taken out of service).

Additionally, "silent data corruption" may develop in processor computing systems where errors occur but are not detected by error checking logic. A hypothetical example may be a misplacement of the decimal point when performing accounting operations. Although a definite error has occurred (e.g., $10,000.00 instead of $100.00 payment), the accounting operations continue to completion and the system believes all operations were completed successfully. This type of "silent error" encourages the design of parallel processing to ensure that all computing elements calculate the same result (answer).

Several methods may be used for error detection/correction where one common method is the use of error detecting bits (e.g., parity bits) to help detect errors when they occur. Using this technique, a bit error may be detected when a parity bit is commonly applied to an 8-bit data field (one of the nine bits is in error). For this simple use of parity bits, the error is ambiguous as all that is known is that there is an error, and there is no information about what kind of error or what recovery mechanism can be implemented. Another technique uses error correcting code (ECC) memory to actually correct errors. This technique uses multiple parity bits, each having a different definition, to help uniquely specify and correct the error. Each parity bit used indicates an error in a subset of the data field which helps narrow down the possibilities of exactly which bit is in error. An additional technique uses parity syndrome bits where the unambiguous errors occurring may be detected and also corrected since this method identifies the bits in error.

Modern processor systems commonly employ a multiple processor structure where parallel processing is performed using a plurality of processors (usually linked in lockstep) to execute instructions and compute answers simultaneously. These processing systems typically use ECC logic and parity syndrome logic to detect and correct constant errors occurring along critical data paths (paths tied to memory arrays). However, soft (transient) errors may occur along the non-critical data paths (paths along which the instruction steam is processed and executed) within the processor that use random logic.

For these parallel processing systems that are commonly connected in a functional redundancy check, both processors execute the instruction stream, along these non-critical data paths, on a clock by clock basis and compare the resulting architectural state updates. If the architectural states (computed answers) differ, an ambiguous error has occurred (similar to the simple use of parity bits). There is enough information to determine that there is a problem, but unless there is sufficiently redundant information, logic or software cannot determine which information is the correct one. The appearance of soft errors where only the architectural state is being compared will corrupt the program flow being currently executed. If this is a restartable transaction in a database system, the operating system software may simply restart the program flow. Alternatively, however, if the operating system (OS) is performing critical system table updates, the error may cause an OS panic and system crash. Somewhere between these two extreme responses would be a system application that just suddenly terminates, leaving the system application user in an unknown state and clearly without his work finished. To prevent these undesirable responses from occurring, there is a need to protect the non-critical data paths of the processor system with a mechanism that provides early detection of soft errors within stages of a multiple stage, pipelined processor system before they propagate to ambiguous error detection.

DETAILED DESCRIPTION

Figure 1:
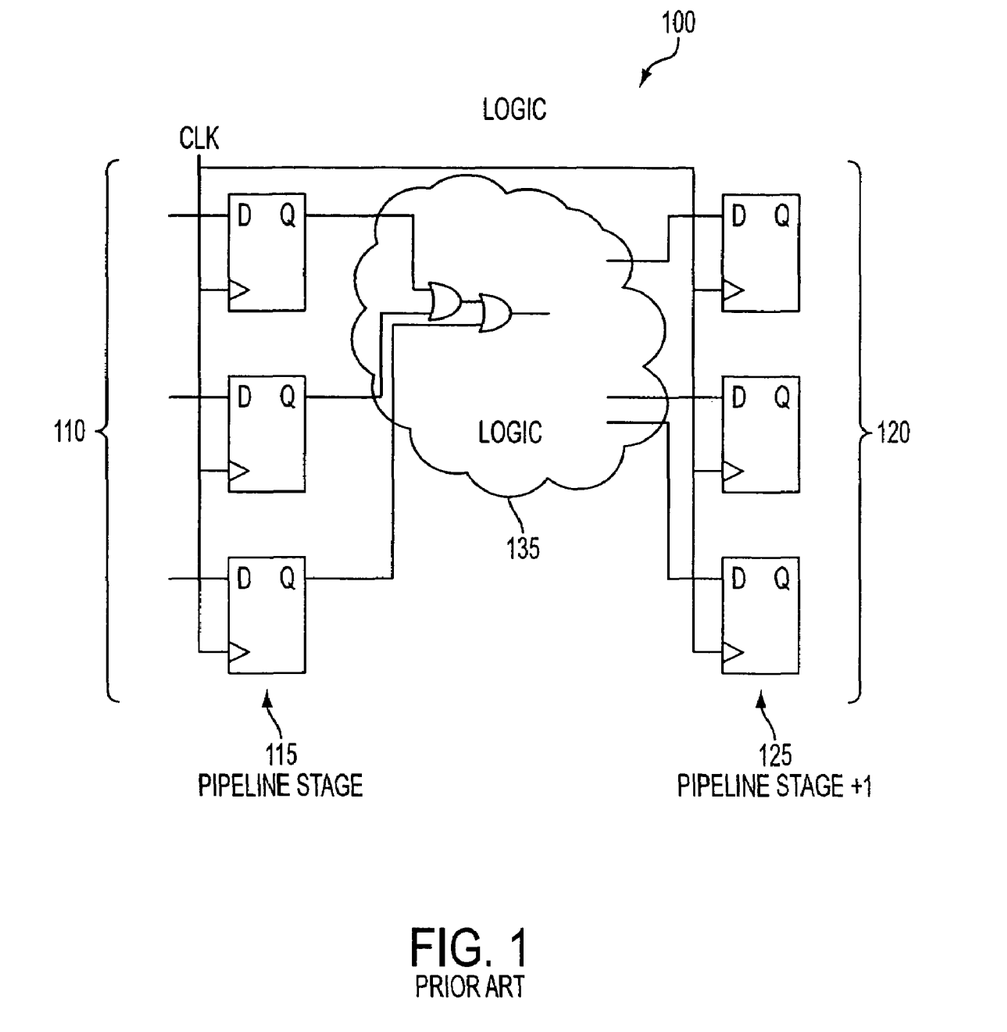
FIG. 1 illustrates a prior art pipeline logic architecture.

FIG. 1 illustrates a prior art pipeline logic architecture 100 for a processor system. The logic architecture 100 includes a first pipeline stage 115, and a succeeding pipeline stage 125 (pipeline stage +1). Both pipeline stages 115, 125 include a plurality of data input/output devices (e.g, functional units, flip-flops) 110, 120 for instruction processing (e.g., fetch, decode, etc.) during operation of the processing system. The pipeline stages 115, 125 are interconnected by logic elements 135 that may perform a variety of logic operations (e.g., OR, AND, etc.) to facilitate operation of the processor system as an instruction stream is fed from pipeline stage 115 to pipeline stage 125 via logic elements 135.

Figure 2:
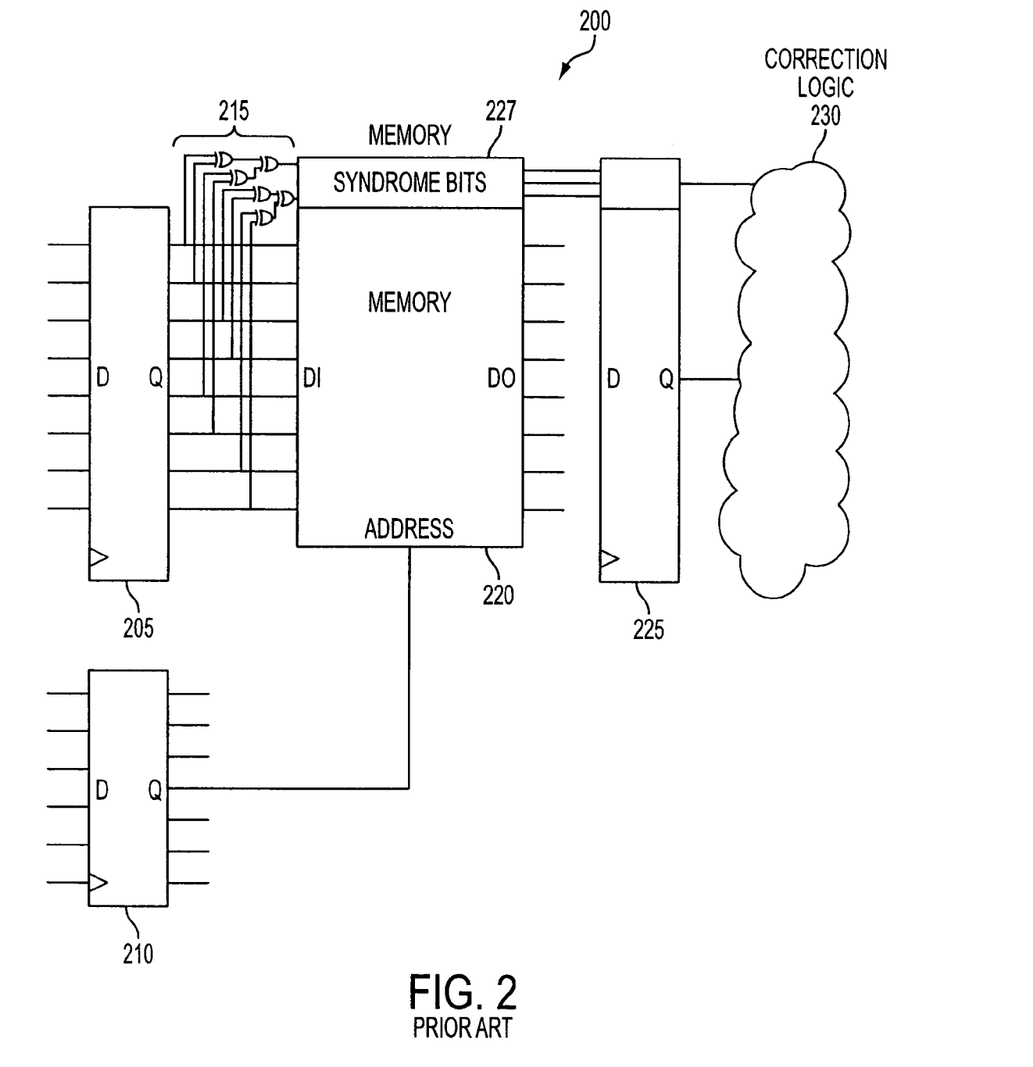
FIG. 2 illustrates a prior art processor memory architecture.

FIG. 2 illustrates a prior art processor system memory architecture 200. The processor system memory architecture includes a plurality of data input/output devices 205, 210, 225, interconnected to memory 220, for providing data input to or accepting data output from memory 220. Memory 220 includes syndrome logic (bit generator) 227 to perform error checking on the data paths (critical) leading to memory 220 using logic elements 215 (e.g., Exclusive-OR functions). Additionally, the memory architecture 200 includes correction logic 230 (e.g., error correction code—ECC), interconnected to data device 225, to also perform error checking on the critical data paths using parity bits within the memory architecture 200. Advantageously, a sufficient number of parity bits are added along the critical data paths by syndrome bit generator 227 and correction logic 230 to not only determine that there is an error, but to seamlessly correct the error as if it never occurred.

Processor system memory architecture 200 may include a large number of memory arrays including, but not limited to tags, register files, instruction caches, data caches, cache index tables, translation look-aside buffer tables (TLB), and dynamic random access memory (DRAM). Also, this error correction mechanism may be implemented entirely in software, a combination of hardware and software, or entirely in hardware.

Figure 3:
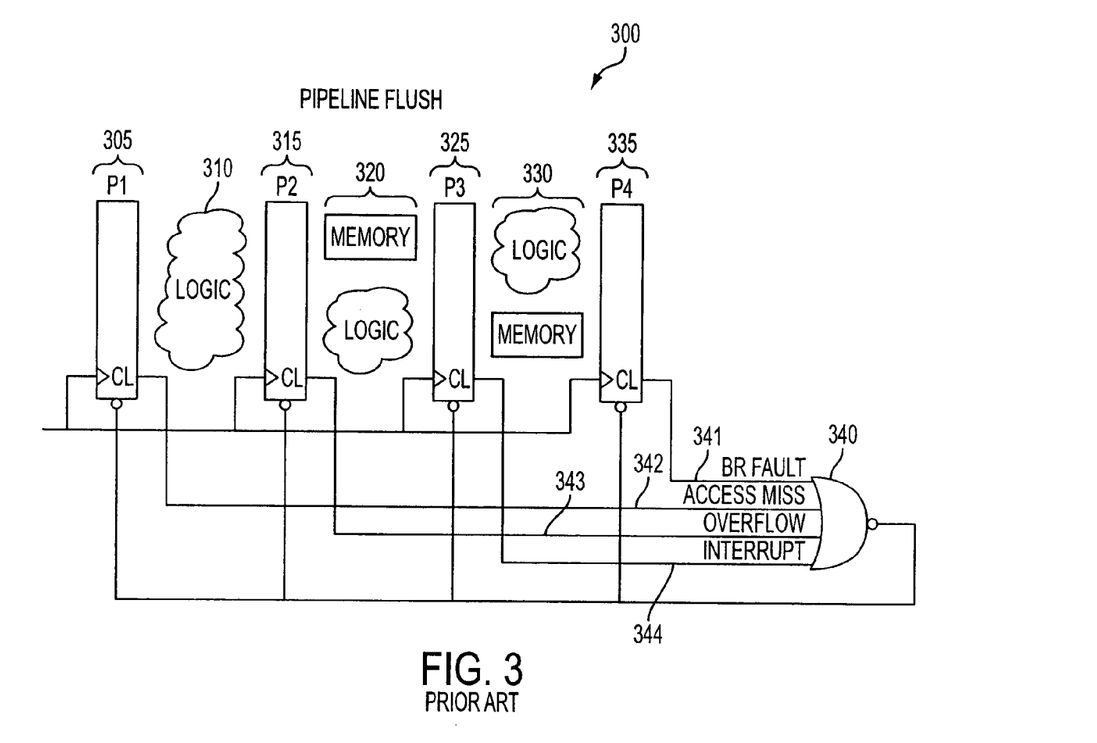
FIG. 3 illustrates a prior art pipeline flush architecture.

FIG. 3 illustrates a prior art pipeline flush architecture 300 for a processor system. The pipeline flush architecture 300 includes a plurality of pipeline stages (P1–P4) 305, 315, 325, 335, comprising one or more data input/output devices (e.g., functional units, flip-flops), interconnected by logic and memory elements 310, 320, 330. The architecture 300 includes logic element 340 (e.g., NOR function) that outputs a flush signal 345 to trigger flushing and restarting of each pipeline stage in response to an error condition being detected. Advantageously, flush signal 345 is sent to each pipeline stage, interconnected by the clear (CLR) input of the data device for each stage, to trigger pipeline flushing and restarting of instruction processing.

Each pipeline stage 305, 315, 325, 335 sends a separate signal input 341, 342, 343, 344 to logic element 340 (e.g., NOR function) to enable flush signal 345 to flush and restart all pipeline stages when an error is detected. Exemplary error conditions include, but are not limited to a branch error 341 (e.g., error in program flow), access miss 342, overflow condition 343, and interrupt condition 344. These error conditions may result from branch prediction logic errors, translation errors, or I/O device signaling.

Figure 4:
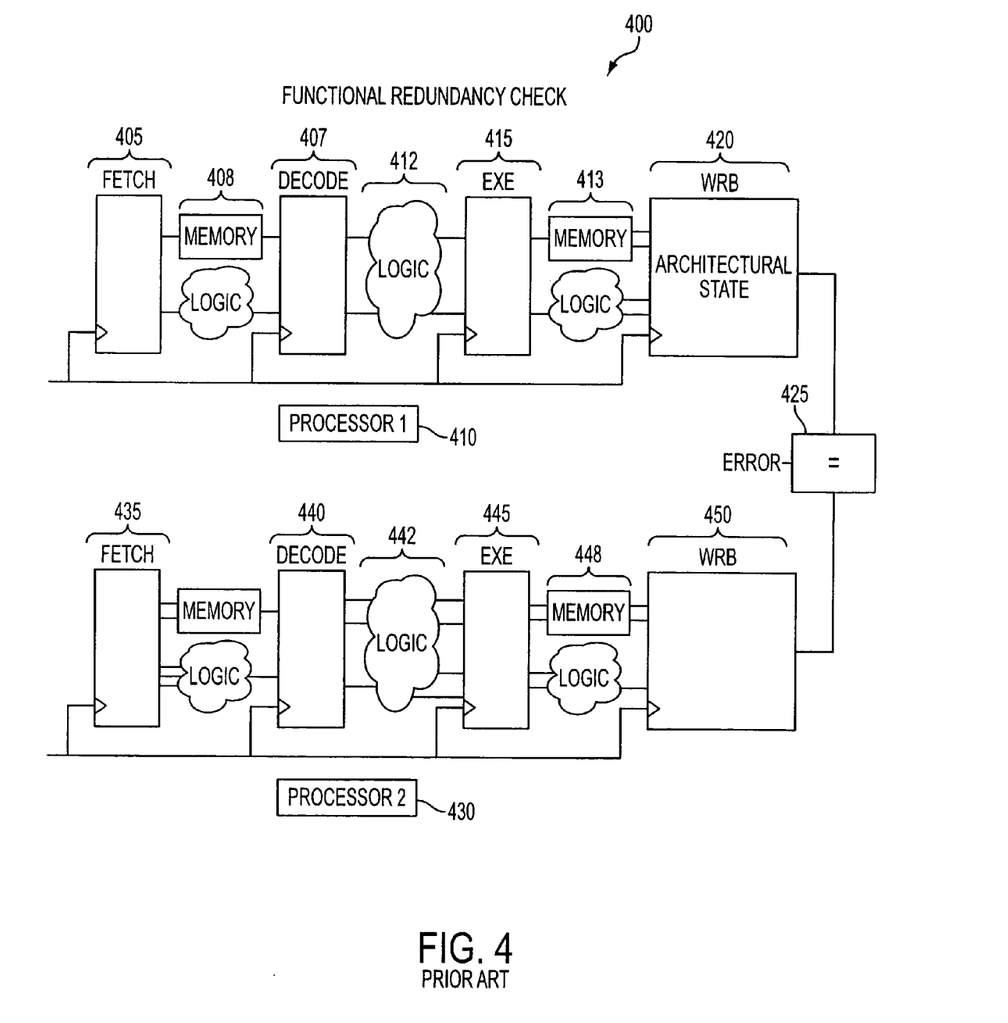
FIG. 4 illustrates a prior art multiple processor system architecture.

FIG. 4 illustrates a prior art multiple processor system architecture 400. The architecture includes processor cores (processor 1, processor 2) 410, 430, both including a plurality (four) of pipeline stages 405, 407, 415, 420, and 435, 440, 445, 450, respectively. Advantageously, these pipeline stages may include fetching operations 405, 435, decoding operations 407, 440, execution operations 415, 445, and write-back operations 420, 450, respectively, as instructions are processed by the stages of the pipeline for both processors. Pipeline stages in both processors 410, 430 are interconnected by a plurality of memory and logic elements 408, 412, 413, and 438, 442, 448, respectively.

During normal operation, both processors 410, 440 will process the same instructions simultaneously. Advantageously, the processors 410, 440 are connected in a functional redundancy check configuration where both processors execute the instruction stream on a clock by clock basis and compare the resulting architectural state updates (computed answers). The architecture 400 includes error detection logic 425 that is used to compare the architectural states resulting from instruction execution performed by processors 410, 440 to detect if an error occurs. For example, processor 410 computes a load into register 1 (not shown) and processor 440 computes a load into register 2 (not shown). This detected error is ambiguous as a problem has been determined, but the system 400 cannot determine which architectural state is correct due to insufficient information. The functional redundancy check system 400 is able to detect these transient (occasional) errors after determining the final architectural state for each processor. A common transient error may result from a bit set being flipped during instruction processing.

Figure 5:
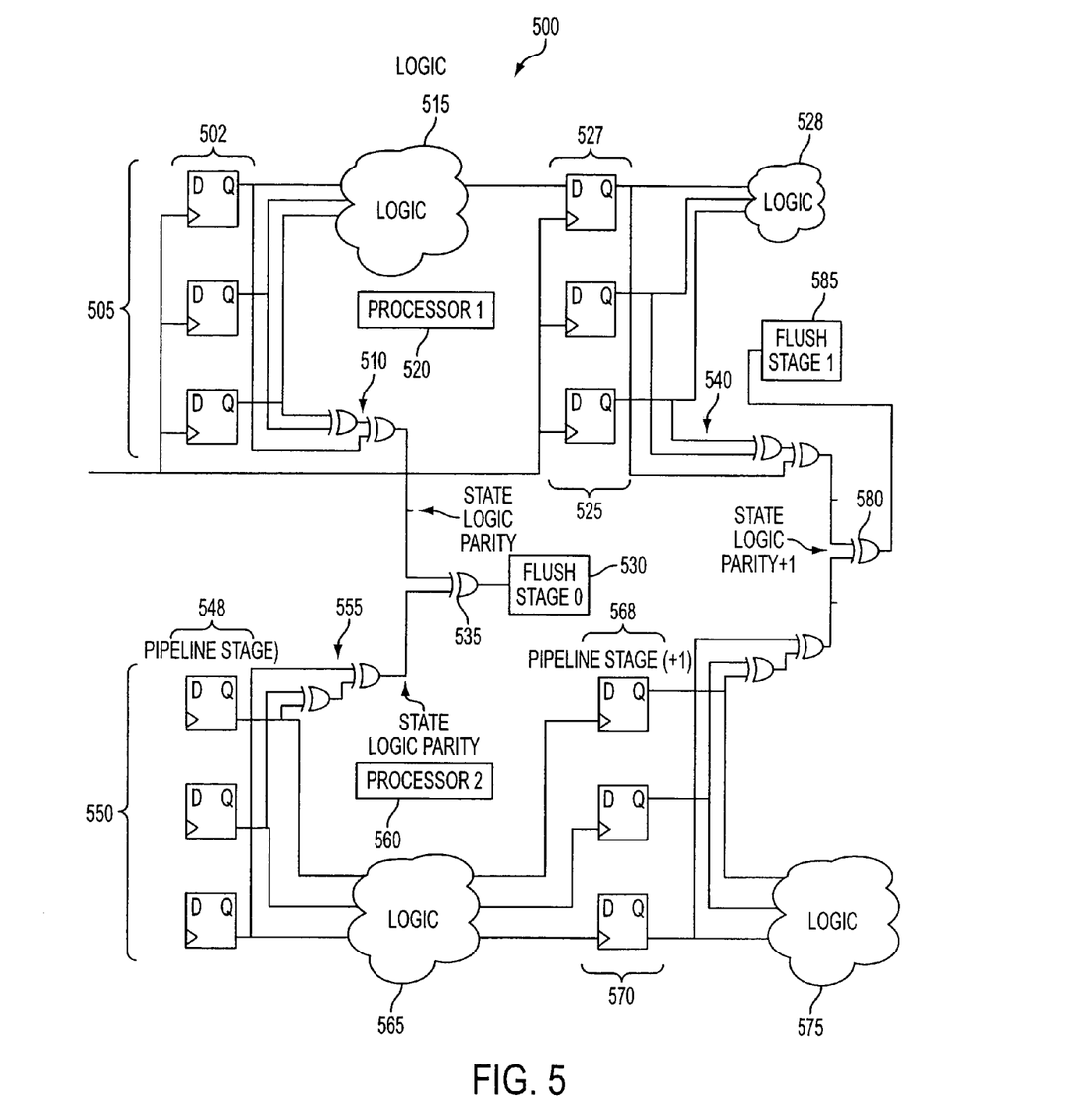
FIG. 5 illustrates a pipeline logic architecture for a multiple processor system in accordance with an embodiment of the present invention.

FIG. 5 illustrates a pipeline logic architecture 500 for a multiple processor system in accordance with an embodiment of the present invention. The logic architecture 500 includes two processors cores (processor 1, processor 2) 520, 560, both processors including a first pipeline stage 502, 548, and a succeeding pipeline stage 527, 568 (pipeline stage +1). Both sets of pipeline stages 502, 548, and 527, 568 include a plurality of data input/output devices (e.g, functional units, flip-flops) 505, 525, 550, 570 for instruction processing (e.g., fetch, decode, etc.) during operation of the processing system. The sets of pipeline stages 502, 548, and 527, 568 are interconnected by logic elements 515, 565 that may perform a variety of logic operations (e.g., OR, AND, etc.) to facilitate operation of the processor system as an instruction stream is fed from the first pipeline stage 502, 548 to the succeeding (second) pipeline stage 527, 568 via logic elements 515, 565, respectively. Additionally, the logic architecture 500 further includes logic elements 528, 575 interconnected to the succeeding (second) pipeline stage 527, 568, respectively, to facilitate interconnection to other succeeding pipeline stages (not shown) for instruction processing.

Advantageously, in accordance with embodiments of the present invention, the pipeline logic architecture 500 further includes parity bit generators 510, 555, and 540, 545 for each set of pipeline stages 505, 548, and 527, 568 respectively, for each processor 520, 560. For this exemplary embodiment, the parity bit generator (e.g., parity tree) generates three bits to use error detection during the each pipeline stage. Each parity bit generator 510, 555, 540, 545 is intercoupled to the data input/output devices 505, 550, 525, 570 along the instruction stream path for each pipeline stage to compute and generate a flush enabling signal. It is noted that three parity bits are used as an exemplary embodiment, and any number of parity bits may be used to detect errors for each pipeline stage.

The respective outputs from parity bit trees 510, 555 (from the first pipeline stage for each processor) are fed to logic element 535 (e.g., Exclusive-OR function) to generate a flush signal 530 (flush stage 0) for the first pipeline stage 502, 548 for each processor 520, 560, respectively. Similarly, the respective outputs from parity bit trees 540, 545 (from the succeeding pipeline stage for each processor) are fed to logic element 580 (e.g., Exclusive-OR function) to generate a flush signal 585 (flush stage 1) for the succeeding (second) pipeline stage 527, 568 for each processor 520, 560, respectively. For example, during operation a miscomparison of the parity bits (using logic elements 535, 580) may be detected indicating an error condition in the respective pipeline stage to trigger a pipeline flush using flush signals 530, 585 in combination with the logic described below in FIG. 6.

Advantageously, in accordance with embodiments of the present invention, the addition of the parity trees allow the internal logic (pipeline) states for each pipeline stage to be determined and verified. The data paths (non-critical) between multiple pipeline stages, along which the instruction stream is processed and executed, can now be checked for errors. The use of random logic along these non-critical data paths may allow randomly occurring soft (temporary) errors to occur during the pipeline stages of the processors (e.g., caused by exposure to cosmic rays and/or alpha particles).

Figure 6:
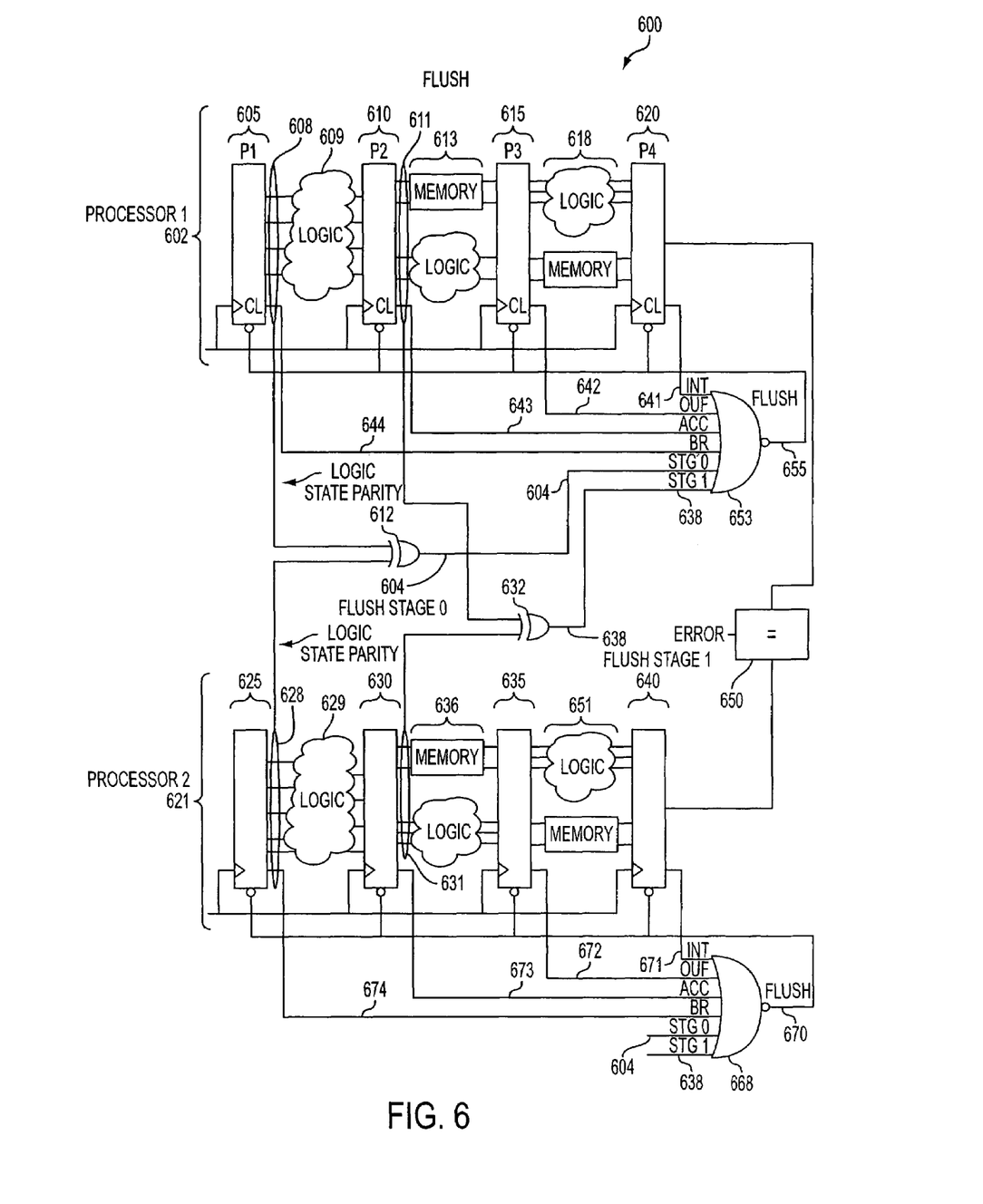
FIG. 6 illustrates a pipeline flush architecture for a multiple processor system in accordance with an embodiment of the present invention.

FIG. 6 illustrates a pipeline flush architecture 600 for a multiple processor system. The pipeline flush architecture 600 includes two processor cores (processor 1, processor 2), both processors including a plurality of pipeline stages (P1–P4) 605, 625, 610, 630, 615, 635, and 620, 640, respectively. Advantageously, for example, these pipeline stages may include fetching operations 605, 625, decoding operations 610, 630, execution operations 615, 635, and write-back operations 620, 640, respectively, as instructions are processed by the stages of the pipeline for both processors. It is noted that these pipeline stage operations are solely exemplary and any set of pipeline stages may be used in accordance with embodiments of the present invention.

Each set of pipeline stages includes one or more data input/output devices (e.g., functional units, flip-flops), interconnected by logic and memory elements 609, 629, 613, 636, 618, 651. The architecture 600 includes logic elements 612, 632 (e.g., Exclusive-OR function) that each output a flush signal (flush stage 0, flush stage 1) 604, 638 for the first set 605, 625 and succeeding (second) set of pipeline stages 610, 630, respectively, to trigger flushing and restarting of each pipeline stage (for each processor) in response to an error condition being detected.

Advantageously, in accordance with embodiments of the present invention, the pipeline flush architecture 600 further includes parity bit generators 608, 628, and 611, 631 for the first two sets of pipeline stages 605, 625, and 610, 630, respectively, for each processor 602, 621. Each parity bit generator 608, 628, 611, 631 is intercoupled to the data input/output devices for the first and second sets of pipeline stages 605, 625, 610, 630 along the instruction stream path to help generate flush signals 604, 638. For example, during operation a miscomparison of the parity bits (using logic elements 612, 632) may be detected indicating an error condition in the respective pipeline stage to trigger a pipeline flush using flush signals 604, 638 in combination with the further logic in FIG. 6 described below.

Each logic element 612, 632 receives as inputs the outputs generated from the parity trees 608, 628, and 611, 631, respectively, for the first and second set of pipeline stages 605, 625, 610, 630 for each processor 602, 621: Output flush signals 604, 638 are generated using the logic elements 612, 632 in response to the outputs from the parity bit trees 608, 628, 611, 631.

The architecture 600 further includes logic elements 653, 668 (e.g., NOR function) that output flush signals 655, 670, respectively, to trigger flushing and restarting of each set of pipeline stages in response to an error condition being detected (e.g., bits are flipped). Advantageously, flush signals 655, 670 are sent to each set of pipeline stages, respectively, via interconnection by the clear (CLR) input of the data device for each stage, to trigger pipeline flushing and restarting in response to an error condition being detected.

During normal operation, both processors 602, 621 will process the same instructions simultaneously. Advantageously, the processors 602, 621 are connected in a functional redundancy check configuration where both processors execute the instruction stream on a clock by clock basis and compare the resulting architectural state updates (computed answers). The architecture 600 includes error detection logic 650 that is used to compare the architectural states resulting from instruction execution performed by processors 602, 621 to detect if an error occurs.

Each set of pipeline stages 605, 625, 610, 630, 615, 635, 620, 640 sends a separate signal input 641, 642, 643, 644, 604, 638, and 671, 672, 673, 674, 604, 638 to logic elements 653, 668, respectively (e.g., NOR function) for both processors 602, 621 to enable flush signals 655, 670 to flush and restart all pipeline stages when an error condition is detected. The input signals 604, 638 generated from the parity trees for the first two sets of stages are included in the flush enabling event signals sent to logic elements 653, 668 to create a new flush enabling event, the detection of an error condition (miscomparison) within a pipeline stage using parity bit logic 608, 628, 611, 631 and logic elements 612, 632. For example, to trigger a flush, a high logic signal (e.g., value of "1") from any one of the inputs to logic elements 653, 668 will output a low logic signal (e.g., value of "0"), using the NOR function, to form an enabling flush signal 655, 670 to flush and restart all pipeline stages that may require a low-logic signal to initiate flushing of the pipeline stages.

Additionally, exemplary error conditions include, but are not limited to a branch error 644, 674 (e.g., error in program flow), access miss 643, 673, overflow condition 642, 672, and interrupt condition 641, 671. These error conditions may result from branch prediction logic errors, translation errors, or I/O device signaling. It is noted that the use of a NOR function for logic elements 653, 668 is solely exemplary and any combination of logic elements (using different logic functions) may be used to effectively trigger a flush for all pipeline stages.

Advantageously, in accordance with embodiments of the present invention, an error condition occurring in either of the first two sets of pipeline stages is detected (via the parity trees), a flush enabling signal for this event is generated, and an actual flush signal is output to clear all pipeline stages and restart the pipeline. It is noted that although only the first two sets of pipeline stages are shown in FIG. 6 to include parity bit trees for detecting errors within the stages, this illustration is exemplary and any number of pipeline stages may be designed with parity bit trees to detect error conditions that occur for that respective pipeline stage.

Advantageously, in accordance with embodiments of the present invention, the detection of a error condition (for the non-critical path) for the internal logic state of a pipeline stage defines a new flush event for a multiple processor system architecture. The new fault condition ("in flight error" being detected) is caused by the detection of a soft error that has not currently altered the architectural state. This new fault condition may be quickly detected during any stage of the pipeline using the new flush enabling signals generated to initiate flushing and restarting of the pipeline using the same or similar logic as for other flush-triggering faults.

It is noted that the flush logic indicated in FIG. 6, enabling a CLR (clear) operation for all data input/output devices (e.g., flip-flops), is solely exemplary, and other methods may be used for flushing the pipeline stages. The basic definition of a flush is to eliminate valid information from prior pipeline stages, and this may be accomplished via any number of methods. Instead of clearing all of the data in the pipeline, the flush signal may cause other remedial actions (changes). These other remedial actions include, but are not limited to, forcing the state of a few select signals to, for example, change an add instruction to a nop instruction or to set a valid flag to invalid. Flushing may also be accomplished by invalidating the operations of the current pipeline stage (that is requesting the flush) and continuing to request this flush for multiple cycles until the previous pipeline stages have drained all of their current operations. Any number of advantageous methods of ignoring pipelined operations while a flush event is being processed may be used, and these methods may depend on the logic and timing implications to the specific processor design being used.

In accordance with embodiments of the present invention, it is noted that the additional flush logic may be implemented on a machine-readable medium having stored thereon a plurality of executable instructions to perform the steps described herein.

In implementation of pipeline state error detection for a multiple processor system, the width (area of error detection coverage for the parity bit generators) of the needed parity bit tree is advantageously balanced between two extremes. The first extreme is to compare the flip-flop state between every flip-flop in both processors that is not covered by ECC syndrome logic. This implementation may be highly undesirable because it would require a large amount of wiring between the processors which would decrease the speed of the system. The second extreme is to generate a single parity bit from each processor. With this second implementation, a soft error caused by an alpha particle or cosmic ray hit could conceivably alter two adjacent flip-flops, and due to the nature of the exclusive or logic operation, an even number of bit changes would not be detected. Advantageously, an implementation in accordance with embodiments of the present invention can be processor design specific and can balance the needed inter-processor wiring with the needed redundancy of parity bits for these most extreme cases to be detected.

Advantageously, single bit or double bit errors may be detected and the pipelines of both processors subsequently flushed and restarted in accordance with embodiments of the present invention. Careful selection of the parity logic may be made to ensure that parity bits cannot alias to the same value if immediately adjacent logic gates are altered. Also, selection of a sufficient number of parity bits allows detection of any desired number of simultaneous bit errors. Variations may be made in the parity bit count, data field width, and maximum simultaneous bit error detection to achieve desired processor reliability. Since the probability of these errors (single event upsets), especially single bit errors, is very small (caused by radiation), flushing and restarting the pipelines greatly increases the likelihood that the program will run to error-free completion on the second attempt.

Robustness and reliability of the processors are improved by also potentially detecting timing and/or logic bugs (errors) that can cause complete processor failures. For processors advantageously connected in a functional redundancy check configuration, the logic design of the two processors can be nearly identical. However, the circuits of the processors can be required to be located at different locations on a chip and may, due to manufacturing variations, have subtle timing differences between the two processors. These timing differences can cause the two processors to diverge in their program flow, and the parity bits would most likely detect this divergence.

A consideration for implementation of embodiments of the present invention is to ensure that soft errors do not erroneously affect the additional flush logic conditions that have been defined by the pipeline (internal) state comparison. Various implementations may be used to make the flush logic robust and avoid false-flush events. One method that may be used is to implement the flush logic such that all reasonable errors to the error detection logic have the effect of triggering a pipeline flush. Because of the nature of pipeline flushes, it is good design practice to have a design tolerate random flushing events. Another method may use special circuit techniques to shield the check circuitry from error (upset) including making the checking circuitry physically large (thereby requiring that any radiation hit produce an abnormally large number of charge carriers), avoiding the use of domino logic, or other techniques for making the checking circuitry insensitive to error. Another alternative method may use parallel (multiple) flush detection where either flush detection circuit may trigger a flush. Advantageously, an inappropriately detected flush condition (false-flush) does not cause a failure.

Although the invention is primarily described herein using a two-processor, pipeline stage parity bit example, it will be appreciated by those skilled in the art that modifications and changes may be made without departing from the spirit and scope of the present invention. As such, the method and apparatus described herein may be equally applied to any multiple processor system that enables pipeline flushing and restarting in response to an error detected during any stage of the pipeline.

The invention claimed is:

1. An apparatus, comprising:
   at least two processors, each processor including a plurality of pipeline stages for processing at least some of the same instructions;
   wherein each pipeline stage includes a parity bit generator to generate at least one parity bit for each pipeline stage; and
   a comparing circuit to compare the parity bit of a stage of one of the at least two processors to the parity bit of the same stage of another of the at least two processors, and indicate an error when the parity bits are different in value.

2. The apparatus of claim 1, wherein the comparing circuit causes both processors to flush and restart when the parity bits are different in value.

3. The apparatus of claim 1, wherein the comparing circuit indicates an error before an answer is computed by both processors at the completion of the plurality of pipelined stages for both processors.

4. The apparatus of claim 1, wherein the comparing circuit indicates an error in response to a single event upset occurring in at least one processor.

5. The apparatus of claim 1, wherein the comparing circuit indicates an error in response to single bit and double bit errors occurring in the system.

6. A machine-readable medium having stored thereon a plurality of executable instructions, the plurality of instructions comprising instructions to:
   process at least some of the same instructions for at least two processors;
   compare at least one parity bit of a first pipeline stage for one processor with at least one parity bit of a second pipeline stage of another processor performing a similar function as the pipeline stage; and
   indicate an error when the parity bits are different in value.

7. The medium of claim 6, wherein said instructions include instructions to flush and restart both processors when the parity bits are different in value.

8. The medium of claim 6, wherein said instructions include instructions to indicate an error before an answer is computed by both processors at the completion of the plurality of pipelined stages for both processors.

9. The medium of claim 6, wherein the difference in parity bit value is caused by a single event upset occurring in at least one processor.

10. The medium of claim 6, wherein said instructions include instructions to indicate an error in response to both single bit and double bit errors occurring in at least one processor.

11. A system comprising:
a memory storing a plurality of instructions;
at least two processors, each processor coupled to said memory and including a plurality of pipeline stages for processing at least some of the same instructions from said memory;
wherein each pipeline stage includes a parity bit generator to generate at least one parity bit for each pipeline stage; and
a comparing circuit to compare the parity bit of a stage of one of the at least two processors to the parity bit of the same stage of another of the at least two processors, and indicate an error when the parity bits are different in value.

12. The system of claim 11, wherein the comparing circuit causes both processors to flush and restart when the parity bits are different in value.

13. The system of claim 11, wherein the comparing circuit indicates an error before an answer is computed by both processors at the completion of the plurality of pipelined stages for both processors.

14. The system of claim 11, wherein the comparing circuit indicates an error in response to a single event upset occurring in at least one processor.

15. The system of claim 11, wherein the comparing circuit indicates an error in response to single bit and double bit errors occurring in the system.

* * * * *